(12) United States Patent
Imanilov (10) Patent No.: US 10,877,602 B2
(45) Date of Patent: *Dec. 29, 2020

(54) DETECTION METHOD FOR A DIGITIZER

(71) Applicant: Microsoft Technology Licensing, LLC, Redmond, WA (US)

(72) Inventor: Benjamin Imanilov, Hod-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,938

(22) Filed: May 31, 2019

(65) Prior Publication Data

US 2019/0286278 A1    Sep. 19, 2019

Related U.S. Application Data

(63) Continuation of application No. 15/447,356, filed on Mar. 2, 2017, now Pat. No. 10,338,742.

(51) Int. Cl.
*G06F 3/041* (2006.01)
*G06F 3/044* (2006.01)
*G06F 3/0354* (2013.01)
*G06F 3/038* (2013.01)

(52) U.S. Cl.
CPC .......... *G06F 3/0418* (2013.01); *G06F 3/0383* (2013.01); *G06F 3/03545* (2013.01); *G06F 3/044* (2013.01); *G06F 3/0416* (2013.01); *G06F 2203/04104* (2013.01)

(58) Field of Classification Search
CPC ....... G06F 2203/04104; G06F 3/03545; G06F 3/0383; G06F 3/0416; G06F 3/0418; G06F 3/044; G06F 3/04184
See application file for complete search history.

(56) References Cited

U.S. PATENT DOCUMENTS

| | | | | |
|---|---|---|---|---|
| 2007/0109274 | A1* | 5/2007 | Reynolds | G06F 3/0416 345/173 |
| 2012/0056841 | A1* | 3/2012 | Krenik | G06F 3/04184 345/174 |
| 2014/0111464 | A1* | 4/2014 | Bakken | G06F 3/0416 345/174 |
| 2014/0118290 | A1* | 5/2014 | Bakken | G06F 3/044 345/174 |
| 2014/0320449 | A1* | 10/2014 | Park | G06F 3/0418 345/174 |
| 2015/0029151 | A1* | 1/2015 | Galambos | G06F 3/0416 345/174 |

\* cited by examiner

*Primary Examiner* — Richard J Hong (57) ABSTRACT

A method includes transmitting a Continuous Wave Frequency Modulated (CWFM) signal on a first drive line of a grid based capacitive sensor and transmitting the CWFM signal with an imposed delay on a second drive line of grid based capacitive sensor simultaneously with transmission of the CWFM signal on the first drive line. Output on a receive line is correlated with the CWFM signal, Fourier transformation is performed on the correlation of the output and coordinates of an object interacting with the grid based capacitive sensor is identified based on frequency and phase information determined from the Fourier transformation.

20 Claims, 7 Drawing Sheets

DETECTION METHOD FOR A DIGITIZER

CROSS REFERENCE TO RELATED APPLICATIONS

This application is a continuation of and claims priority to U.S. application Ser. No. 15/447,356, entitled "DETECTION METHOD FOR A DIGITIZER," filed Mar. 2, 2017, which is incorporated herein in its entirety.

BACKGROUND OF THE INVENTION

Digitizer sensors are used for touch detection in many Human Interface Devices (HID) such as laptops, track-pads, MP3 players, computer monitors, and smart-phones. A touch-screen is a Flat Panel Display (FPD) integrated with a digitizer sensor. A grid based capacitive sensor is one type of digitizer sensor. Grid based capacitive sensors typically track free style input provided with an object such as a finger or a conductive object with a mutual capacitive or self-capacitive detection method. A grid based capacitive sensor may also be used to pick up signals emitted by a stylus and thereby track position of the stylus. Coordinates of the tracked object may be reported to the HID. Some active styluses emit a signal that includes information. A circuit associated with the grid based capacitive sensor may decode and report the information to the HID.

SUMMARY OF THE INVENTION

According to an aspect of some embodiments of the present disclosure a grid based capacitive sensor is interrogated with a Continuous Wave Frequency Modulated (CWFM) signal for mutual capacitive detection. In some implementations, the grid based capacitive sensor is interrogated by consecutively transmitting the CWFM signal on each a plurality of transmit or drive lines. In response to the interrogation, receive lines are sampled. In other example implementations, interrogation is by simultaneously transmitting the CWFM signal on a plurality of the drive lines with defined delays that are imposed on the each of the CWFM signals. Based on simultaneous transmission, a single correlation computation per receive line may be applied to extract information from each of the plurality of drive lines.

According to an aspect of some embodiments of the present disclosure, a stylus is configured emit one or more CWFM signals. Optionally, at least one of the CWFM signals may be further modulated to include information. The CWFM signals may be picked up by a grid based capacitive sensor and position of the stylus may be tracked. Information included in the CWFM signal may be demodulated by a circuit associated with the grid based capacitive sensor.

According to an aspect of some embodiments of the present disclosure, there is provided a method for reducing the number of computation performed to identify input picked up by each of the plurality of receive lines of a grid based capacitive sensor. The method is based on using CWFM signals to operate the grid based capacitive sensor. In some example implementations, outputs from the receive lines of the grid based capacitive sensor are multiplied by the CWFM, transformed to the frequency domain and then combined with imposed delays so that frequency and phase analysis may be performed once on the combined signal to identify information originating from each of the plurality of lines.

Unless otherwise defined, all technical and/or scientific terms used herein have the same meaning as commonly understood by one of ordinary skill in the art. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

According to some example implementations, a grid based capacitive sensor of a computing device is interrogated (or triggered) with a CWFM signal. The CWFM signal may be beneficial in improving immunity to both single and multiple tone interfering signals. Example sources of tone interference are the power supply, electricity network, fluorescent lamps, and liquid crystal display (LCD). By spreading the interrogation signal over a frequency spectrum, the effect of the interference on touch detection may be mitigated. Typically, a noise environment around a computing device may vary due to varying grounding states of the computing device or due to other varying conditions. The frequency band afforded by the CWFM signal may provide for dynamically selecting a relatively clean frequency from which the touch effect may be detected.

According to some example implementations, a plurality of drive lines may be interrogated with the same CWFM signal. Different delays may be imposed on the CWFM signals transmitted on each of the drive lines so that output from the different interrogation signals may be differentiated on the receive lines. In some example implementations, the CWFM signal may be a chirp signal or other linearly or not linearly varying CWFM signal. A single correlating function may be applied to identify a touch effect. Optionally, Digital Fourier Transformation (DFT) or Fast Fourier Transformation (FFT) computation is applied. Using a linear CWFM signal may simplify the DFT or FFT computation.

Typically, the touch effect is identified as an attenuation of the interrogation signal due to presence of a finger or other capacitive object. An origin of the touch effect may be determined based on amplitude of the frequencies as determined by DFT or FFT. The methods as disclosed herein reduces the number computations as compared to known methods of simultaneously interrogating drive lines with a set of orthogonal frequencies and detecting output in each of the orthogonal frequencies with a dedicated correlation computation.

According to some example implementations, the number of computations required to identify a touch location may be further reduced by combining output from a plurality of receive lines prior to performing a correlation computation and Fourier transformation to identify location of a touch effect on the combined output. A different delay may be imposed on outputs from each of the receive lines prior to combining the outputs. The delays imposed on the outputs may be larger than a sum of the delays imposed on the drive lines for simultaneous transmission of the interrogation signal.

According to some example implementations, a stylus is configured to emit a CWFM signal. In some example implementations, the stylus may transmit data by alternating between two CWFM signals that are orthogonal. For example, a linearly increasing CWFM signal (a chirp signal) may be transmitted for sending bit "0" and a linearly decreasing CWFM signal may be transmitted for sending a bit "1." In some exemplary implementations, two or more signals may be simultaneously transmitted over separate non-overlapping frequency bands. Optionally, only one of the signals may be modulated with data while the other signal may be used as a beacon signal.

Figure 1:
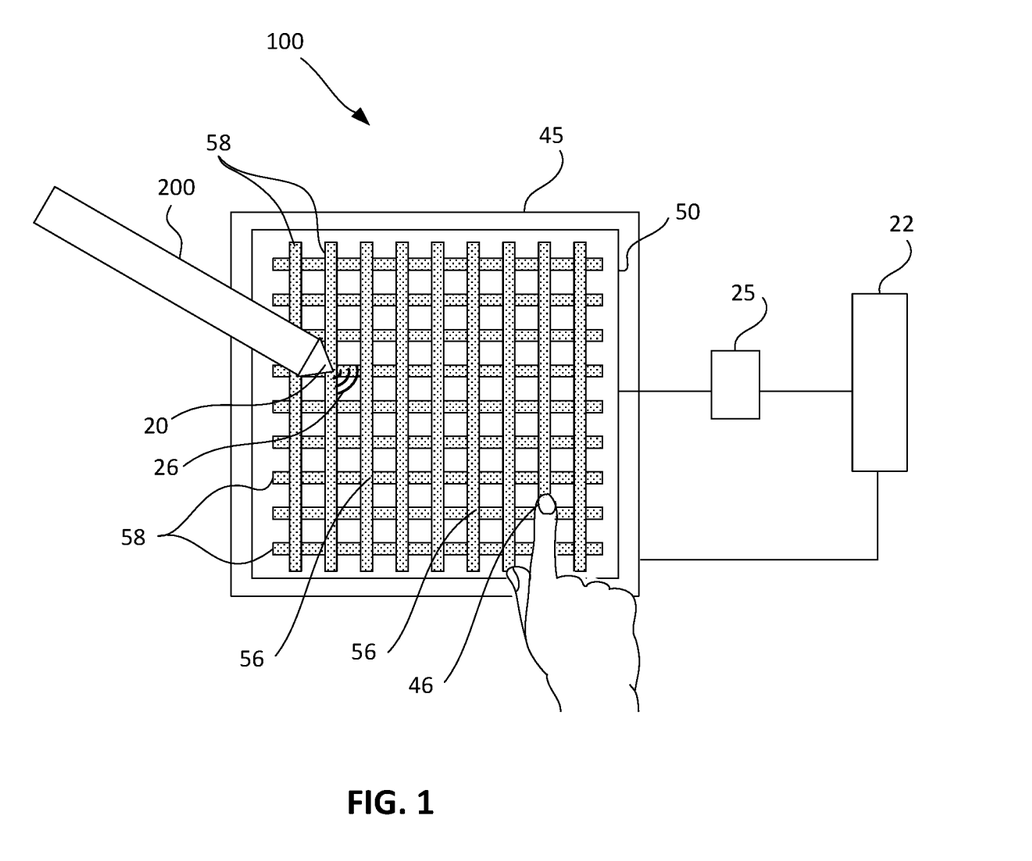
FIG. 1 is a simplified block diagram of an example computing device including a touch-screen for tracking stylus and finger input.

Reference is now made to FIG. 1 showing a simplified block diagram of an example computing device including a touch-screen for tracking stylus and finger inputs. According to some implementations, a computing device 100 includes a display screen 45 integrated with a digitizer sensor 50. Digitizer sensor 50 may be a grid based capacitive sensor including conductive lines 58 forming a grid defining junctions 56. Sensor 50 is operated to detect both input by stylus 200 emitting a signal 26 and to detect a finger effect due to one or more fingertips 46 or other conductive objects interacting with sensor 50. Digitizer sensor 50 may be operated by digitizer circuit 25 and may be in communication with host 22.

Digitizer circuitry 25 may apply mutual capacitive detection or a self-capacitive detection for sensing a touch effect of fingertip 46. Typically, during mutual capacitive and self-capacitive detection, digitizer circuitry 25 generates and sends an interrogation signal (or triggering signal) to one or more conductive lines 58 of digitizer sensor 50 and samples output in response to the interrogation. During mutual capacitive detection, some or all of conductive lines 58 along one axis of the grid are interrogated simultaneously or in a consecutive manner, and in response to each interrogation event, outputs from conductive lines 58 on the other axis are sampled. The conductive lines 58 that are interrogated are referred to as the drive lines and the conductive lines 58 that are sampled in response to interrogation are referred to as the receive lines. Typically, mutual capacitive detection provides for detecting coordinates of multiple fingertips 46 touching sensor 50 at the same time (multitouch).

According to example implementations, digitizer circuit 25 interrogates sensor 50 with a CWFM signal. In some example implementations, the digitizer circuit 25 simultaneously interrogates a plurality of the conductive lines 58 in a mutual capacitive detection method with the same CWFM signal by transmitting the CWFM signal with different imposed delays on each of the plurality of conductive lines 58.

According to some example implementations, signal 26 emitted by stylus 200 is a CWFM signal or more than one CWFM signal. Optionally, one or more of the CWFM signal emitted by stylus 200 may be further modulated to include data. Digitizer circuit 25 may periodically sample outputs from conductive lines 58 to detect signal 26 emitted by stylus 200 at one or more junctions of sensor 50. Typically, digitizer circuit 25 is configured to detect coordinates of tip 20 of stylus 200 based on the detected signals and may also decode the detected signals to determine data transmitted by stylus 200.

Digitizer circuitry 25 may use both analog and digital processing to process signals detected with digitizer sensor 50. Optionally, some or all of the functionalities of digitizer circuit 25 may be integrated into host 22. Typically, output from digitizer circuitry 25 is reported to host 22. Typically, the output provided by digitizer circuitry 25 to host 22 may include coordinates of one or more fingertips 46, coordinates of writing tip 20 of stylus 200 and additional data provided by stylus 200, e.g. pressure, tilt, and battery level.

Figure 2:
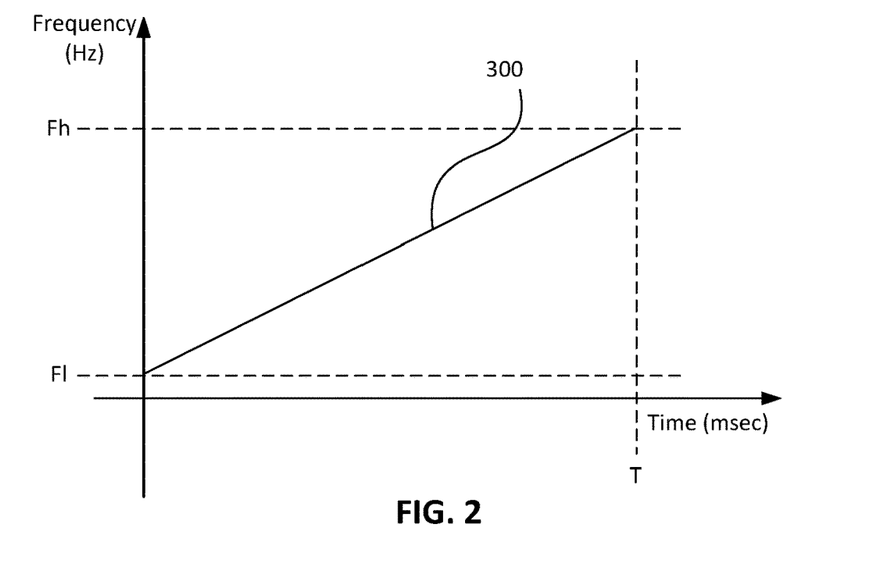
FIG. 2 is a graph of an example CWFM signal transmitted on a drive line.

Reference is now made to FIG. 2 showing a graph of an example CWFM signal transmitted on a drive line. According to some example implementations, the CWFM signal 300 is a linearly increasing signal or a chirp signal that is defined by:

$$\text{sig}(t) = \cos(2\pi(Fl \cdot t + b \cdot t^2)) \text{ for } 0 < t < T \qquad \text{Equation (1)}$$

$$\text{sig}(t) = 0 \text{ for } t \leq 0 \text{ and } t \geq T \qquad \text{Equation (2)}$$

Where:
T is the transmitting period;
Fh is the highest frequency;
Fl is the lowest frequency; and
b is defined by (Fh−Fl)/(2T).

Transmitting period, T may be selected between a range of 10 μsec to 100 msec. The frequency band may be for example a band defined between 20 Hz and 100 MHz. In other example implementations, a linearly decreasing CWFM signal may be used or a CWFM signal that increases or decreases in a stepwise fashion may be used.

Figure 3:
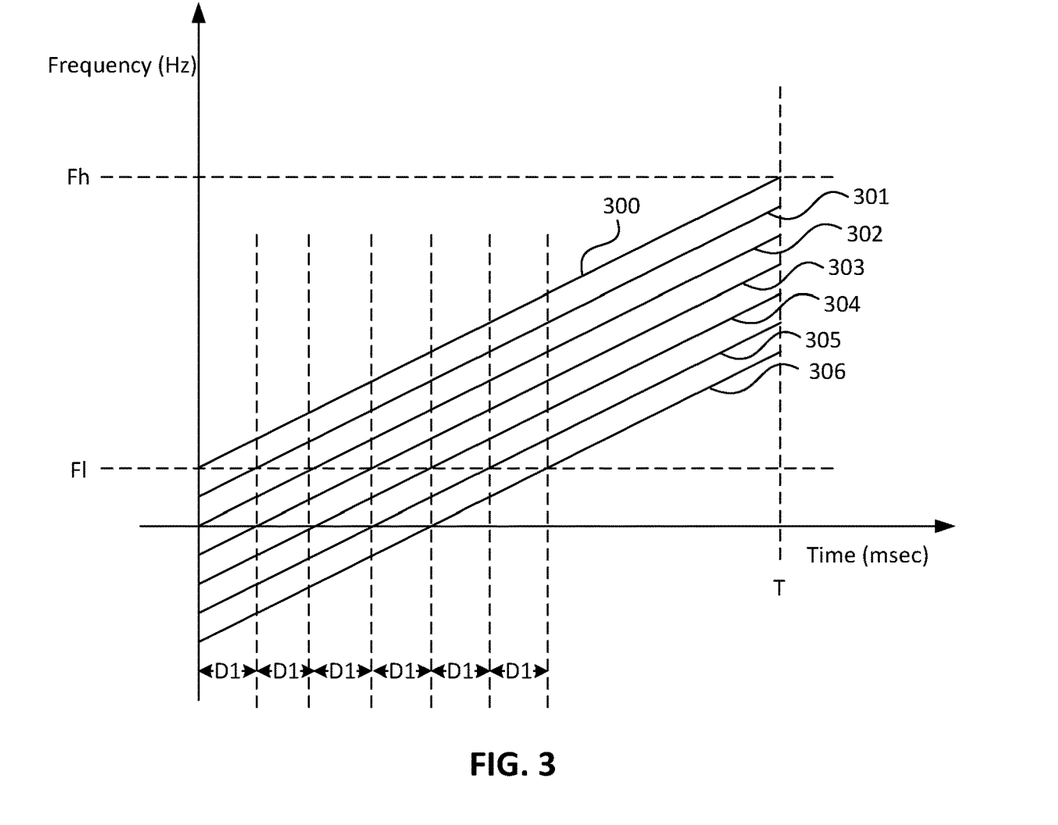
FIG. 3 is a graph of example CWFM signals simultaneously transmitted on a plurality of drive lines.

Reference is now made to FIG. 3 showing a graph of example CWFM signals simultaneously transmitted on a plurality of drive lines. According to some example implementations, the CWFM signal 300 is transmitted on each of the drive lines with a series of imposed delays D1. Optionally, D1 may be less than or equal to the transmitting period, T divided by the number of drive lines being simultaneously triggered. For example, when seven drive lines are simultaneously transmitted, a first drive line may be interrogated with CWFM signal 300, a second drive line may be interrogated with CWFM signal 301 including delay D1, a third drive line may be interrogated with CWFM signal 302 including delay 2*D1, and a fourth to seventh drive line may be interrogated with CWFM signals 303 to 306 respectively.

CWFM signals 303 to 306 may be imposed with delays 3*D1 to 6*D1 respectively. Optionally, the frequency band of CWFM signals 301 to 306 may be extended within the defined transmission period 0<t<T so that all the drive lines are transmitting over the entire transmission period 0<t<T. According to some example implementations, an array of CWFM signals that are simultaneously transmitted may be defined by:

$$\text{sig\_}n(t)=\cos(2\pi(F1(t-D1_n)+b(t-D1_n)^2)) \text{ for } 0<t<T \quad \text{Equation (3)}$$

$$\text{sig\_}n(t)=0 \text{ for } t\leq 0 \text{ and } t\geq T \quad \text{Equation (4)}$$

Where:

$$D1_n=n*D1, 0\leq n\leq N-1; \text{ and}$$

N is the number of drive lines that are simultaneously interrogated.

In other example implementations, the CWFM signals, e.g. CWFM 301-306 may be transmitted with imposed delays $D1_n$ that are not integer multiplies of D1. Alternatively, the frequency band of signals 301-306 may be maintained between Fl and Fh and sig_n(t) may be zero outside this frequency band.

Figure 4:
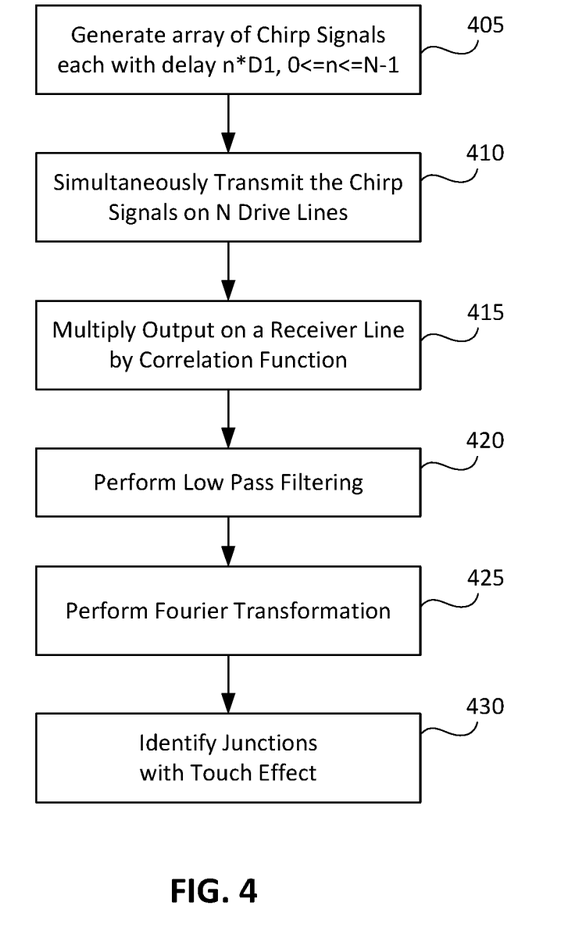
FIG. 4 is a simplified flow chart of an example method for finger touch detection.

Reference is now made to FIG. 4 showing a simplified flow chart of an example method for finger touch detection. In some example implementations, a digitizer circuit generates an array of chirp signals each with delays defined for example in Equation (3) (block 405). The array of chirp signals may be simultaneously transmitted on N drive lines for interrogating a digitizer sensor (block 410). In response to the interrogation, output on a receive line may be multiplied by a correlation function (block 415). The correlation function is the same as the interrogation signal in complex form and with no imposed delay and may be defined by:

$$\text{sig}_{corr(t)}=e^{2\pi i(Fl\cdot t+b\cdot t^2)} \quad \text{Equation (5)}$$

Low pass filtering may be applied on the result from multiplying the output with sig_corr(t) to reject any frequencies above Fh (block 420). An expected component originating from drive line Tx_n transmitting with delay $D1_n$ may be defined by:

$$0.5\cdot e^{i\cdot(2\pi F_n t+Phi_n)} \quad \text{Equation (6)}$$

When signals from a plurality of drive lines Tx_n are received simultaneously at an Rx electrode, the result could be denoted by sum:

$$\sum_{n=1}^{N} 0.5\cdot e^{i\cdot(2\pi F_n t+Phi_n)} \quad \text{Equation (7)}$$

Where:

$$F\_n=2(D1_n)(b); \text{ and}$$

$$Phi\_n=(D1_n)(Fh+b(D1_n)).$$

F_n denotes a center frequency of a bin of a FFT or DFT where all the energy from a transmitting line, n, is received and is in Hz. Phi_n is the phase of the complex output of a FFT or DFT at an n'th bin. Phi_n may be used for a coherent decision system.

DFT or FFT may be performed on the low pass filtered output to determine the energies and phases of CWFM signals originating from each of the N drive lines (block 425). Based on the one DFT or FFT computation, all the energies and phases from all the N drive lines transmitting a signal may be determined. The Fourier transformation (DFT or FFT) may be selected to be of size N or down-sampled to size N, with frequency resolution and spacing per delay period D1. Junctions showing a touch effect may be detected based on the energy determined at junctions between the N drive lines and the receive line (block 430).

Figure 5:
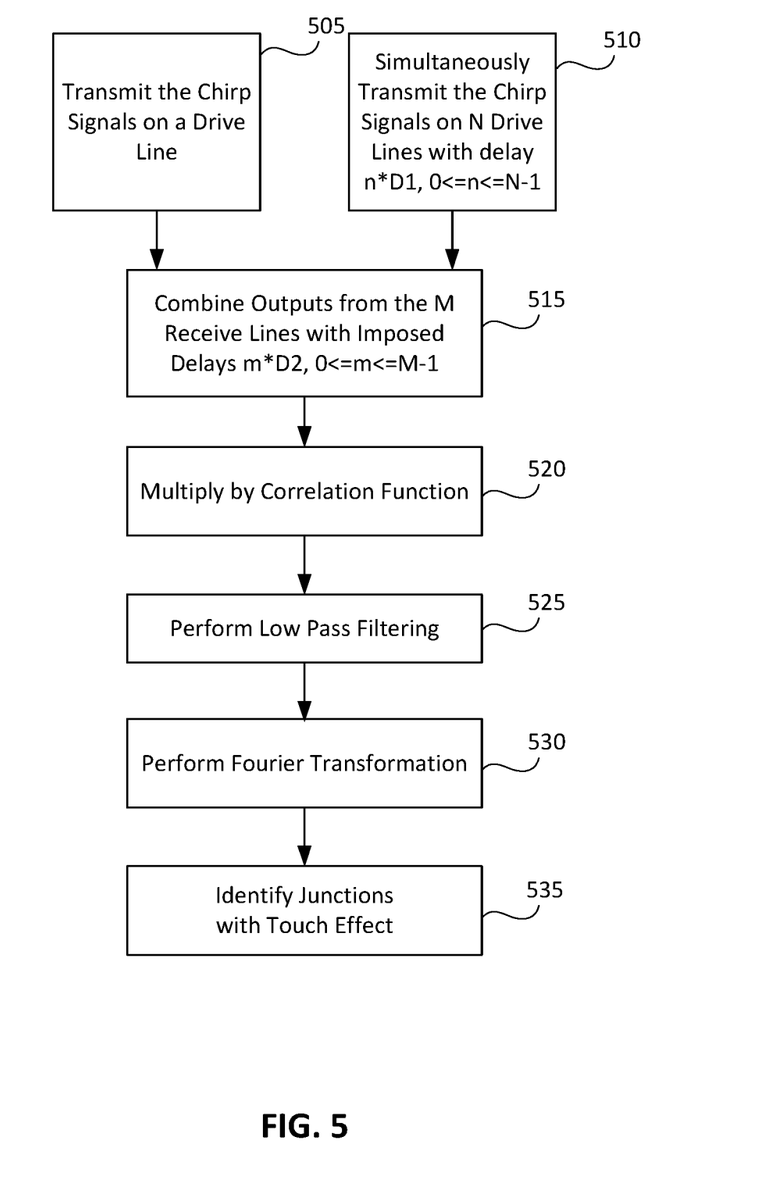
FIG. 5 is a simplified flow chart of another example method for finger touch detection.

Reference is now made to FIG. 5 showing a simplified flow chart of another example method for finger touch detection. According to some example implementations, outputs from some or all the receive lines may be combined and processed as a single combined signal. This method may be applied when the interrogation signal, e.g. the chirp signal is transmitting on each drive line in a consecutive manner (block 505) as well as when the interrogation signal is simultaneously transmitted on N drive lines (block 510).

In some example implementations, outputs are combined from M receive lines with delays m*D2 where $0\leq m\leq M-1$ (block 515). Delay D2 may range between 10 μsec to 100 msec and is selected to be larger than (N-1)*D1 when applied during simultaneous interrogation of the drive lines. Optionally, D2 may be selected to equal transmission period T divided by number of receive lines M.

The combined signal may be multiplied with sig_corr(t) defined by Equation (5) (block 520). Low pass filtering may be applied on the result to reject any frequencies above Fh (block 525). DFT or FFT may be performed on the low pass filtered output to determine the energies and phases of CWFM signals originating from each of the N drive lines and M receive lines (block 530). Based on the one DFT or FFT computation, all the energies and phases from all the N drive lines and M receive lines may be determined. Junctions showing a touch effect may be detected based on the energy determined at junctions between the N drive lines and the receive line (block 535).

Figure 6A:
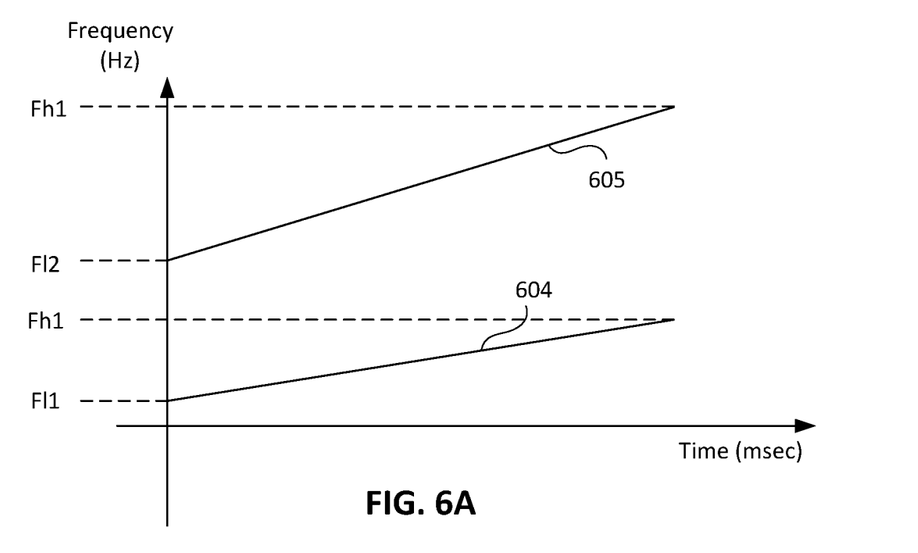
FIG. 6A is a simplified graph of an example pair of linearly varying CWFM signals simultaneously transmitted by a stylus.

Reference is now made to FIG. 6A showing a simplified graph of an example pair of linearly varying CWFM signals simultaneously transmitted by a stylus. In some example implementations, a pair of linearly varying CWFM signals 604 and 605 may be transmitted over a time period T but may span a non-overlapping band. For example, signal 604 may range between Fl1 and Fh1 and signal 605 may range between Fl2 and Fh2. Signals 604 and 605 are shown as two linearly increasing signals with different slopes. Alternately, one or both signals may be linearly decreasing. Still further, each of signals 604 and 605 may share a same slope.

Figure 6B:
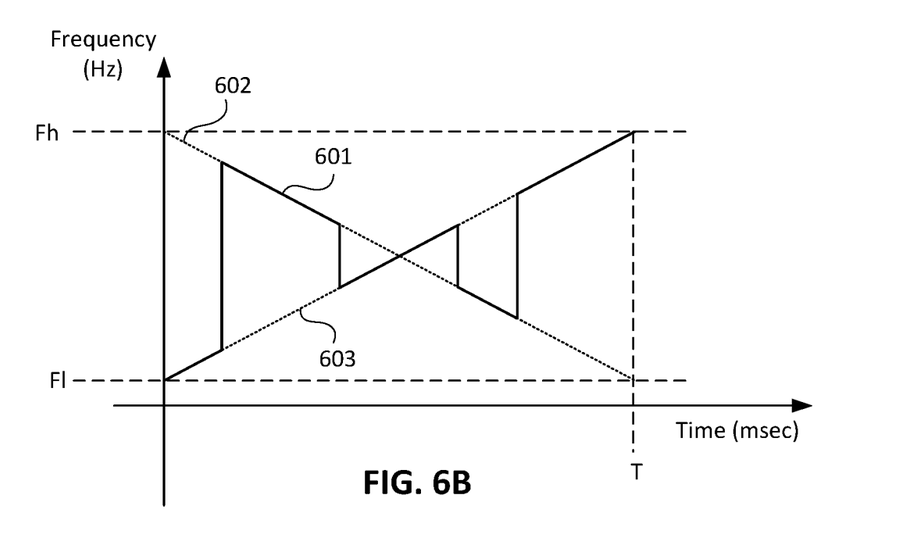
FIG. 6B is a simplified graph of an example pair of linearly varying CWFM signals that are alternatively transmitted by a stylus.

Reference is now made to FIG. 6B showing a simplified graph of an example pair of linearly varying CWFM signals that are alternatively transmitted by a stylus. In some example implementations, one of the signals in pair (604, 605 of FIG. 6A) may be operated as a beacon signal and the other signal of the pair may be modulated with data. Alternatively, a single modulated signal may be transmitted and that signal may be used by the digitizer circuit to both detect coordinates of the stylus and to decode data modulated on the signal.

In one example implementation, modulation may be introduced by alternating between transmitting a linearly decreasing signal 602 to represent bit 0 and a linearly increasing signal 603 to represent a bit 1 over a single transmission period. In the example shown in FIG. 6B, curve 601 represents the binary data '10011011'.

In another example implementation, a single bit may be transmitted per transmission period T based on the following equations:

$$\text{Bit}=0 \Rightarrow \text{sig0}(t)=\cos(2\pi(Fh\cdot t-b\cdot t^2)) \quad \text{Equation (8)}$$

$$\text{Bit}=1 \Rightarrow \text{sig1}(t)=\cos(2\pi(Fl\cdot t+b\cdot t^2)) \quad \text{Equation (9)}$$

The signal as modulated by Equations (8-9) may be used by the digitizer circuit to both detect coordinates of the stylus and to decode data modulated on the signal. For example the circuit may search for both a rising and a falling chirp to determine location and depending on what was found the received bit may be determined.

Figure 7:
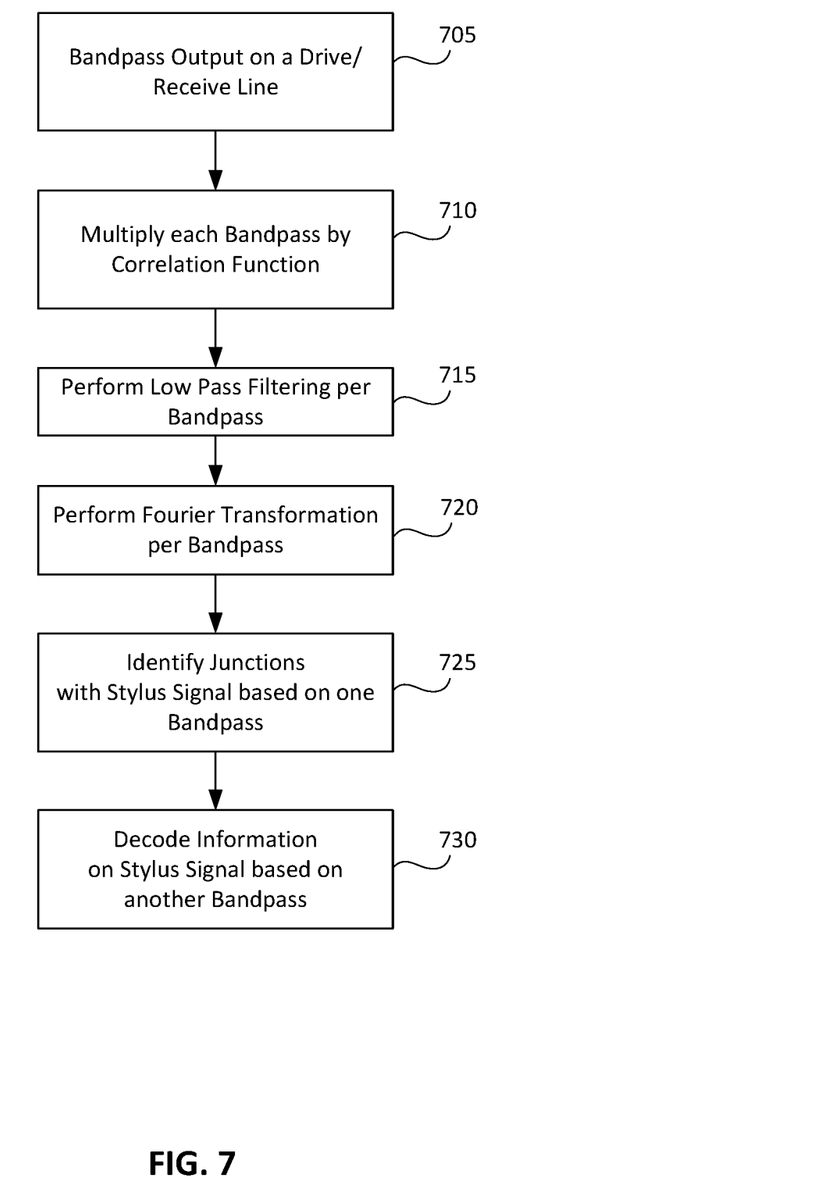
FIG. 7 is a simplified flow chart of an example method for stylus detection.

Reference is now made to FIG. 7 showing a simplified flow chart of an example method for stylus detection. In some example embodiments, when a stylus is configured to simultaneously transmit two signals with non-overlapping frequency bands, a bandpass filter may be applied to separate the two signals (block 705). Each band may be multiplied by a correlation function matching the expected signal in that band (block 710) and then low pass filtered (block 715). DFT or FFT may be performed on the low pass filtered output to determine the energies and phases of CWFM signals on the conductive lines in both axes of the grid based sensor (block 720). Junctions including a stylus signal may be identified based on the energy determined along both axes (block 725). If the stylus signal is expected to include data, the signal may be demodulated to detect the data (block 730).

Figure 8:
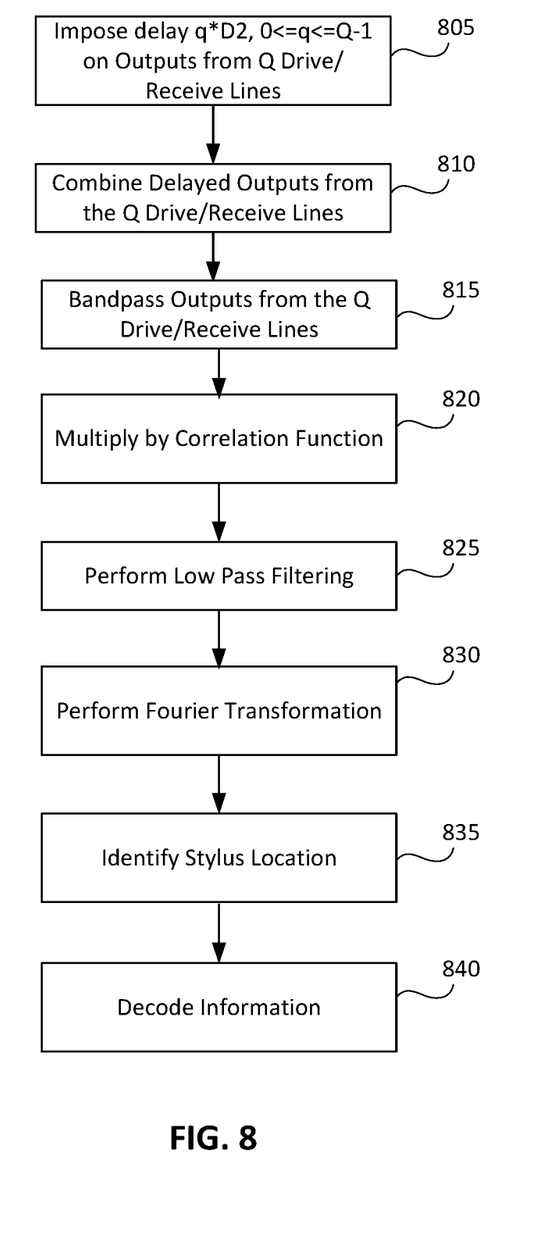
FIG. 8 is a simplified flow chart of another example method for stylus detection.

Reference is now made to FIG. 8 showing a simplified flow chart of another example method for stylus detection. In some example implementations, output from receive lines on both axes of the grid may be combined and correlation may be performed on the combined output to determine energies at each junction based on one correlation computation. A delay q*D2, 0<=q<=Q−1 may be imposed on outputs from Q Drive/Receive Lines (block 805) and the outputs as delayed may be combined (block 810). When two signals with non-overlapping frequencies are simultaneously transmitted, a bandpass filter may be applied to separate the signals (block 815). Each bandpass may be multiplied by its correlation function (block 820) and low pass filtered (block 825). DFT or FFT may be applied on the output from the low pass filtering (block 830) of the combined signals. Based on the energy and phase information derived from the DFT or FFT, junctions including the stylus signal may be identified as well as energies of the stylus signal in each junction (block 835). Location of the stylus may be determined based on energies at detected junctions including a stylus signal. If the stylus signal is encoded, the data may be decoded (block 840).

According to an aspect of some example implementations, there is provided a method comprising: transmitting a Continuous Wave Frequency Modulated (CWFM) signal on a first drive line of a grid based capacitive sensor; transmitting the CWFM signal with an imposed delay on a second drive line of grid based capacitive sensor simultaneously with transmission of the CWFM signal on the first drive line; correlating output on a receive line with the CWFM signal; performing Fourier transformation on the correlation of the output; and identifying coordinates of an object interacting with the grid based capacitive sensor based on frequency and phase information determined from the Fourier transformation.

Optionally, the CWFM signal is a linearly varying signal.

Optionally, a frequency band of CWFM signal transmitted on the second drive line is shifted with respect to the CWFM signal transmitted on the first drive line.

Optionally, a duration over which the CWFM signal is transmitted on the first drive line is the same as a duration over which the CWFM signal is transmitted over the second drive line.

Optionally, the Fourier transformation is performed with digital Fourier transformation.

Optionally, the Fourier transformation is performed with fast Fourier transformation.

Optionally, the method includes transmitting the CWFM signal with an second imposed delay on a third drive line of grid based capacitive sensor simultaneously with transmission of the CWFM signal on the first drive line and the second drive line, wherein the second imposed delay is twice the imposed delay on the second drive line.

Optionally, the method includes low pass filtering the output to reject frequencies above the frequency band of the CWFM signal.

According to an aspect of some example implementations, there is provided a method comprising: combining outputs from a plurality of lines of a grid based capacitive sensor, wherein output from each of the lines is added to the combination with a defined delay; correlating the combination with a CWFM signal in complex form; performing Fourier transformation on the correlation of the combined outputs; and identifying coordinates of an object interacting with the grid based capacitive sensor based on frequency and phase information determined from the Fourier transformation.

Optionally, the method includes transmitting the CWFM signal on a first drive line of a grid based capacitive sensor.

Optionally, the method includes transmitting the CWFM signal with an imposed delay on a second drive line of grid based capacitive sensor simultaneously with transmission of the CWFM signal on the first drive line.

Optionally, the defined delay is larger than the imposed delay on the second drive line.

Optionally, the defined delay on the output from each of the receive lines is an integer multiple of a defined delay period.

Optionally, the method includes demodulating data included in the CWFM signal.

Optionally, the method includes band passing filtering the combination to separate two CWFM signals each transmitted over a different frequency band.

Optionally, the CWFM signal is a linearly varying signal.

Optionally, the combination includes output from lines over two axes of the grid based capacitive sensor.

Optionally, the method includes low pass filtering the combination to rejection portion of the outputs including frequencies above the frequency band of the CWFM signal.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:
1. A method comprising:
transmitting a Continuous Wave Frequency Modulated (CWFM) signal on a first drive line of a grid based capacitive sensor;
transmitting the CWFM signal with an imposed delay on a second drive line of grid based capacitive sensor simultaneously with transmission of the CWFM signal on the first drive line, wherein the CWFM signal is dynamically selected as one of an increasing signal and a decreasing signal over different transmission cycles;

correlating output on a receive line with the CWFM signal, wherein output on the receive line is correlated with both the increasing and the decreasing CWFM signal;

performing Fourier transformation on the correlation of the output; and identifying coordinates of an object interacting with the grid based capacitive sensor based on frequency and phase information determined from the Fourier transformation.

2. The method of claim 1, wherein the CWFM signal is a non-linearly varying signal.

3. The method of claim 1, further comprising low pass filtering the output to reject frequencies above a frequency band of the CWFM signal.

4. The method of claim 1, wherein one of the increasing and decreasing signal represents a bit '0' and the other of the increasing and decreasing signal represents a bit '1'.

5. The method of claim 1, wherein a frequency band of CWFM signal transmitted on the second drive line is shifted with respect to the CWFM signal transmitted on the first drive line.

6. The method of claim 1, wherein a duration over which the CWFM signal is transmitted on the first drive line is the same as a duration over which the CWFM signal is transmitted over the second drive line.

7. The method of claim 1, wherein the Fourier transformation is performed with digital Fourier transformation.

8. The method of claim 1, wherein the Fourier transformation is performed with fast Fourier transformation.

9. The method of claim 1, further comprising transmitting the CWFM signal with a second imposed delay on a third drive line of grid based capacitive sensor simultaneously with transmission of the CWFM signal on the first drive line and the second drive line.

10. The method of claim 9, wherein the second imposed delay is twice the imposed delay on the second drive line.

11. One or more computer-readable storage devices comprising computer executable instructions stored thereon, that when executed by one or more processors, cause the one or more processors to perform operations comprising:

transmitting a Continuous Wave Frequency Modulated (CWFM) on a first drive line of a grid based capacitive sensor transmitting the CWFM signal with an imposed delay on a second drive line of grid based capacitive sensor simultaneously with transmission of the CWFM signal on the first drive line, wherein the CWFM signal is dynamically selected as one of an increasing signal and a decreasing signal over different transmission cycles;

correlating output on a receive line with the CWFM signal, wherein output on the receive line is correlated with both the increasing and the decreasing CWFM signal;

performing Fourier transformation on the correlation of the output; and identifying coordinates of an object interacting with the grid based capacitive sensor based on frequency and phase information determined from the Fourier transformation.

12. The one or more computer-readable storage devices of claim 11, comprising combining outputs from a plurality of lines of a grid based capacitive sensor, wherein output from each of the plurality of lines is added to the combination with a defined delay.

13. The one or more computer-readable storage devices of claim 12, further comprising computer executable instructions stored thereon, that when executed by one or more processors, cause the one or more processors to perform operations comprising transmitting the CWFM signal with a second imposed delay on a third drive line of grid based capacitive sensor simultaneously with transmission of the CWFM signal on the first drive line and the second drive line, wherein the second imposed delay is twice the imposed delay on the second drive line.

14. The one or more computer-readable storage devices of claim 12, wherein the defined delay is larger than the imposed delay on the second drive line.

15. The one or more computer-readable storage devices of claim 12, wherein the defined delay on the output is an integer multiple of a defined delay period.

16. The one or more computer-readable storage devices of claim 12, further comprising computer executable instructions stored thereon, that when executed by one or more processors, cause the one or more processors to perform operations comprising demodulating data included in the CWFM signal.

17. The one or more computer-readable storage devices of claim 12, further comprising computer executable instructions stored thereon, that when executed by one or more processors, cause the one or more processors to perform operations comprising band passing filtering the combination to separate two CWFM signals each transmitted over a different frequency band.

18. The one or more computer-readable storage devices of claim 11, wherein the CWFM signal is a non-linearly varying signal.

19. The one or more computer-readable storage devices of claim 12, wherein the combination includes output from lines over two axes of the grid based capacitive sensor.

20. The one or more computer-readable storage devices of claim 12, further comprising computer executable instructions stored thereon, that when executed by one or more processors, cause the one or more processors to perform operations comprising low pass filtering the combination to rejection portion of the outputs including frequencies above the frequency band of the CWFM signal.

* * * * *